United States Patent [19]
Dunn, Jr. et al.

[11] 3,731,297
[45] May 1, 1973

[54] APPARATUS FOR DETECTING THE ACID FORMATION IN LIQUID SOLVENTS

[75] Inventors: James L. Dunn, Jr.; James C. Renfro; John V. Goode, all of Lake Jackson, Tex.

[73] Assignee: The Dow Chemical Company, Midland, Mich.

[22] Filed: Sept. 25, 1968

[21] Appl. No.: 762,532

[52] U.S. Cl. ................................340/248, 324/62 R
[51] Int. Cl. ..............................................G08b 21/00
[58] Field of Search ............................240/248, 253; 324/65, 62, 71

[56] References Cited

UNITED STATES PATENTS

| 3,409,250 | 9/1969 | Vorgt | 340/228 |
| 3,320,570 | 5/1967 | Lied, Jr. | 340/65 |

Primary Examiner—Benedict V. Safourek
Assistant Examiner—Barry L. Leibowitz
Attorney—Griswold & Burdick, Glwynn R. Baker and A. Cooper Ancona

[57] ABSTRACT

The present invention comprises a method and apparatus for detecting acid-formation in non-conductive liquids by monitoring the change in resistance brought about by the acid-corrosion of a metal immersed in said liquid.

4 Claims, 3 Drawing Figures

Patented May 1, 1973 3,731,297

INVENTORS.
James L. Dunn, Jr.
James C. Renfro
John V. Goode
BY [signature]
ATTORNEY

3,731,297

APPARATUS FOR DETECTING THE ACID FORMATION IN LIQUID SOLVENTS

BRIEF DESCRIPTION OF INVENTION

In accordance with the present invention the deterioration of a liquid, which is non-conductive electrically, is determined by measuring the increase in resistance of an electrical current passing through a metal conductor whose resistance is a proportional function of its cross-section and whose cross-section is reduced by acid attack. The method of the present invention comprises immersing in said liquid a conductor, which is chemically corroded by either inorganic or organic acids, measuring the increase in the resistance to the passage of current through said conductor, electrically signaling predetermined incremental increases in resistance so as to alert an operator in the immediate vicinity of the liquid to the rate of its deterioration.

The apparatus in accordance with the present invention comprises a resistance measuring circuit connected to a sensing element consisting of an electrically conductive, acid-corrodible metal immersed in a non-conductive liquid, such as a chlorinated solvent.

The apparatus detects solvent deterioration through acid build-up which may be caused by loss of stabilizers, oxidative degradation, and/or light and heat induced degradation by measuring the increase in resistance of a metal which is corroded away by the acid. Corrosion of the metal changes the electrical resistance across the immersed element, thus creating an unbalance in the circuitry. The unbalance causes current to be impressed across a signal device. The signal device is designed to be activated when a predetermined state of unbalance is reached. The signal device conveniently may be a light, bell or other type of visual or auditory alarm. The circuitry may and usually does contain one indicator which signals visually the apparatus is working and that the solvent has not reached a predetermined point of deterioration. The apparatus is also provided with an adjustment to compensate for slow "aging" of the metal coating.

The method utilizing the apparatus described above for detecting the presence of a corrosive substance, e.g. an acid, in an environment containing the same or capable of generating the same comprises a. establishing an electric circuit consisting at least of
 1. a source of power
 2. a signal means
 3. a conductive surface in said environment which is subject to attack by said corrosive substance, said conductive surface when attacked increasing in resistance in a manner indicative of said attack, b. introducing said conductive surface into an environment in which the presence of a corrosive substance is to be detected.

DETAILED DESCRIPTION OF THE INVENTION

Figure 1:
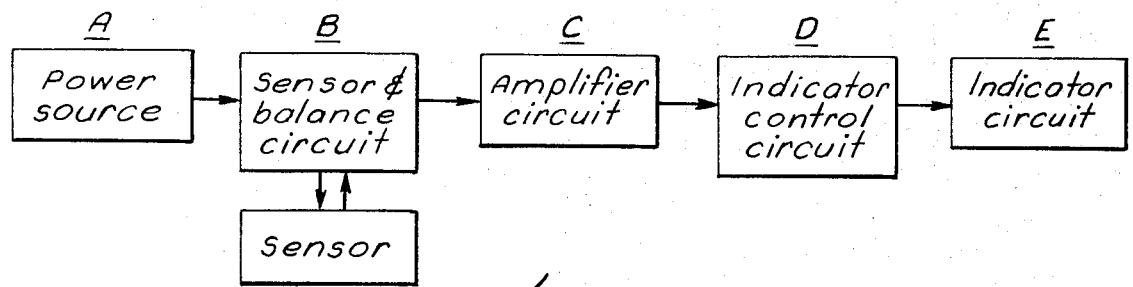

An embodiment of an apparatus for carrying out the method of the present invention is shown in schematic diagram in FIG. 1. The diagram has been divided into the several units which perform functions essential to operation of the apparatus as a detector.

Figure 2:
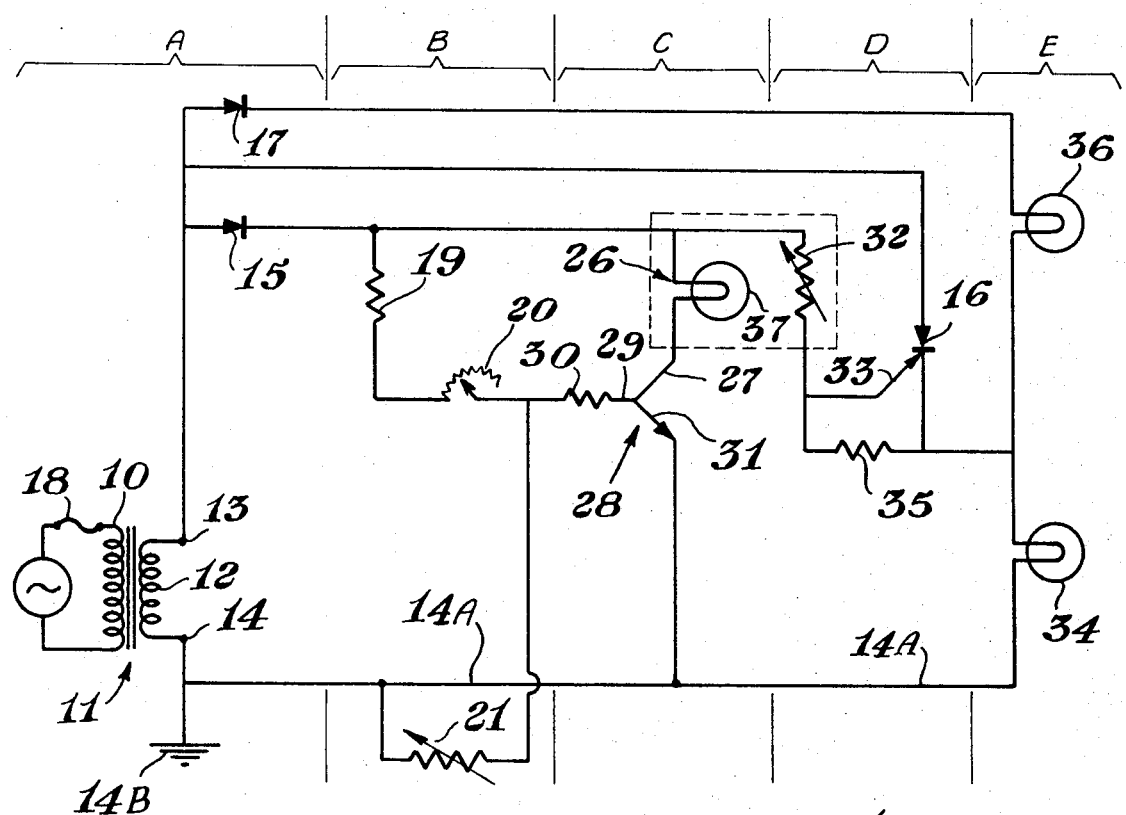

A detailed diagram of one configuration of the embodiment is shown in FIG. 2. The several functions, for which there are enumerable equivalent electrical and electronic configurations, are identified by letters in the drawing which are employed in the following description of the function.

Figure 3:
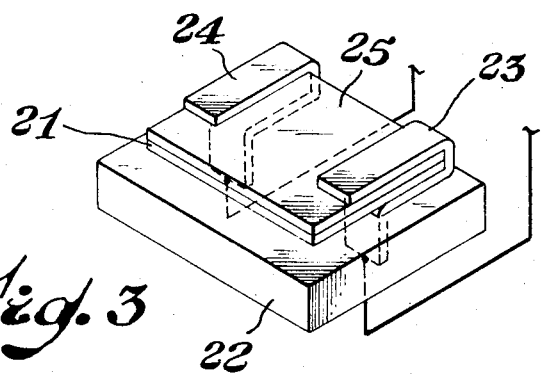

A detailed drawing of the sensing element has been shown in FIG. 3 for clarity.

A preferred embodiment of the present invention is illustrated in the drawings. The illustration, FIG. 1, has been divided into five lettered sections for ease of description. The five sections illustrated are:

A. Power Source;
B. Sensor and Balance Circuit;
C. Amplifier Circuit;
D. Indicator Control Circuit; and,
E. Indicator Circuit and each will be described with particular reference to the electrical and electronic elements illustrated in the drawings, FIGS. 2 and 3.

A. Power Source

The Power Source A, is illustrated within the brackets designated with the letter A, and comprises a 110 volt, 60 cycle a.c. supply, provided with a fuse 18, supplying power to the primary winding 10 of a step-down transformer 11. A secondary winding 12 of the transformer 11 supplies power at about 12 volts a.c. Connected in parallel to a first terminal 13 of the secondary winding 12 are two silicon rectifiers 15 and 17 and one silicon controlled rectifier SCR 16, each providing a source of half-wave rectified direct current to one or more of the sections of the apparatus. Terminal 14, the second terminal, of the secondary winding 12 is connected to a common or ground return 14A from all sections of the apparatus, and is grounded, as at 14B.

B. Sensor and Balance Circuit

The Sensor and Balance Circuit B receives the output of and is connected across the silicon rectifier 15 and the common return 14A to secondary power supply terminal 14. The Sensor and Balance Circuit comprises a fixed resistor 19 connected in series with the rectifier 15 and with a variable resistor 20 and a sensor or chemically variable resistor 21. The sensor 21 as shown in FIG. 3, is provided with a non-conductive base member 22 to which are affixed a pair of spaced apart conductive clips 23 and 24, one of which clips 23 is connected to variable resistor 20 and the other 24 to line 14A. Positioned in and held by the clips 23 and 24 is a non-conductive bar or support member 25 for the sensor 21 which is, in the preferred embodiment, a thin coating of a conductive, corrodible metal in electrical contact with the clips 23 and 24 of non-corrosive material.

C. Amplifier Circuit

The Amplifier Circuit C, is also connected between the output of rectifier 15 and terminal 14 via the common return 14A. The Amplifier Circuit comprises an illuminating lamp 37 of a photo conductive cell 26 connected in series with collector 27 of a transistor 28. The emitter 31 of the transistor 28 is connected to the common return 14A. The transistor base 29 is connected to the resistor 20 of the Sensor and Balance Circuit B through fixed resistor 30.

D. Indicator Control Circuit

This circuit is also connected across rectifier 15 and terminal 14. The circuit D comprises a photo sensitive resistor 32 which in response to the illumination of lamp 37 controls the flow of current to gate 33 of the silicon controlled rectifier 16. Silicon controlled rectifier 16 is connected across secondary terminal 13 and in series with the filament of a low resistance lamp 34 of Indicator Circuit E, and returns to the secondary terminal 14 via common return 14A. A resistor 35 is connected to photosensitive resistor 32 in the photo conductive cell 26 and to the cathode of silicon controlled rectifier 16.

The photoconductive cell 26, consisting of the illuminating lamp 37 and photosensitive resistor 32, acts as a unit to isolate the amplifier circuit C from the indicator control circuit D, thus serving as a safety device.

E. Indicator Circuit

The Indicator Circuit E is comprised of two lamps of different wattage in series across the secondary power supply through rectifier 17. The lamps consist of a high resistance lamp 36 and a low resistance lamp 34. Lamp 36 is positioned between the cathode of rectifier 17 and the cathode of silicon controlled rectifier 16 and in series with lamp 34.

Having described one embodiment of a circuit which will detect and signal deterioration of a chlorinated solvent, the following description of operation of the circuitry will have particular reference to the drawings.

A source of alternating current is impressed across the primary winding 10 of transformer 11. The resulting voltage on the secondary side 12 will be about 1/10 of that impressed across the primary. For example, and preferably, if a 110–115 volt alternating current is passed through primary winding 10 the resulting voltage across secondary winding 12 will be about 12 volts of alternating current. The employment of the only half-wave rectifiers in the lines permits only a half-wave of the current to pass. Thus, the current flows only one-half of the alternating cycle. For purposes of illustration the current will be assumed to pass only when the half-wave is positive. Thus, with a positive half-wave, current will flow through rectifier 15 to resistor 19 and if variable resistor 20 is set to a value such that the voltage drop across the sensing element 21 does not exceed the voltage required to turn on the transistor 28, the current will complete its circuit to the secondary winding 12 of transformer 11 and no current will pass through resistor 30. Current will also flow from rectifier 17 through the element of lamp 36 continuing through lamp 34. Since lamp 36 is a high resistance lamp in series with low resistance lamp 34, essentially all the voltage will be developed across lamp 36 causing it to glow while lamp 34 will only pass current and not glow. If hydrochloric acid or other solvent deteriorating materials are introduced into or generated in the solvent, the sensor 21, preferably zinc, will be corroded, increasing the resistance to the current. When this occurs, the symmetry of the circuit will be changed and current will flow through resistor 30 to transistor 28 wherein it will be amplified to cause a current to flow in amplifier circuit C illuminating the filament of lamp 37. Photoconductive cell 26 will, in response to the illumination, permit current to flow to gate 33 which turns on the silicon controlled rectifier 16 reducing the voltage across lamp 36 and causing an increase of current through lamp 34. This increased flow of current to lamp 34 illuminates the lamp signaling the condition of increased resistance in the sensing element 21.

The resistance 20 may then be reset to balance the increased resistance of the element 21 thereby causing current again to by-pass resistor 30, opening gate 33 and lighting lamp 36. Lamp 34 is extinguished.

Periodic adjustments in resistance 20 or automatic readjustments are required as the sensing element normally corrodes slowly over a period of several months. When the full adjustment of resistor 20 has been reached, the sensing element must be replaced. A fast change of the element however, indicates solvent deterioration. If the solvent has deteriorated it will be necessary to add stabilizer or purify the solvent to remove the corrosive ingredients and prevent damage to the parts being cleaned by the solvent or its vapors.

It is to be understood that while an alternating current has been described as the source of electrical energy, a direct current source can be employed with but slight modification of the circuit, for example a wheatstone bridge. Rectifiers need not be employed if d.c. current is employed, however, the silicon controlled rectifier 16 must be replaced with a current sensitive switch element which will, upon response from the photosensitive element, short lamp 36 permitting full current to flow to lamp 34.

The metal of the sensing element is any acid-corrodible metal such as zinc. The sensor is preferably a metallic coating applied to a non-conductive substrate by vaporizing the metal with resistance heating in an evacuated container wherein is placed the non-conductive substrate. Other metals may be substituted for the zinc, e.g. aluminum, iron, cadmium and magnesium, providing the particular metal chosen is compatible with the solvent system. Other methods of depositing the metal may be used. It is preferred that a uniform coating of the metal be from about 0.05 to about 0.8 microns thickness. Coatings outside this range reduce the sensitivity of the apparatus. It is also to be understood that a wire of small diameter may be used in place of the coated substrate.

In the particular utility described in the foregoing specification, a chlorinated hydrocarbon solvent was used in which the degradation of the solvent produced HCl which then attached the metal of the sensor. It is to be understood that the device can also be used in other electrically non-conductive liquids. For example, the build-up of acid in engine lubricating oil could be monitored.

Other modifications and equivalent electrical and electronic elements can be substituted for those described in the specification without departing from the spirit, purpose and operability of the invention.

We claim:

1. An apparatus for detecting the deterioration through acid build-up of chlorinated solvents which comprises in combination:
   1. a sensing element of an electrically conductive metal coating of from about 0.05 to about 0.8 microns thickness on an electrically non-conductive base,
   2. a means for measuring the change in the electrical resistance of said sensing element and
   3. an alarm or signal means responsive to an increase in resistance in said sensing element.

2. An apparatus for detecting the deterioration through acid build-up of chlorinated solvents which comprises:

1. a sensing element of an electrically conductive coating of from about 0.05 to about 0.8 microns thickness on an electrically non-conductive base;
2. a variable resistance circuit capable of balancing the resistance to a current flow through said sensing element;
3. an amplifier circuit for amplifying an unbalance in current between the sensing element and the variable resistance circuit;
4. an alarm circuit operatively responsive to current through the amplifier and
5. a source of unidirectional current across said elements.

3. The apparatus of claim 2 wherein the amplifier activates a light source which is operatively associated with a photosensitive element and which latter element controls the alarm circuit.

4. The apparatus of claim 2 wherein the corrodible electrically conductive coating is zinc.

* * * * *